March 10, 1953 T. R. JUETTNER 2,630,882
MEASURING VALVE FOR CENTRALIZED LUBRICATING SYSTEMS
Filed June 16, 1949
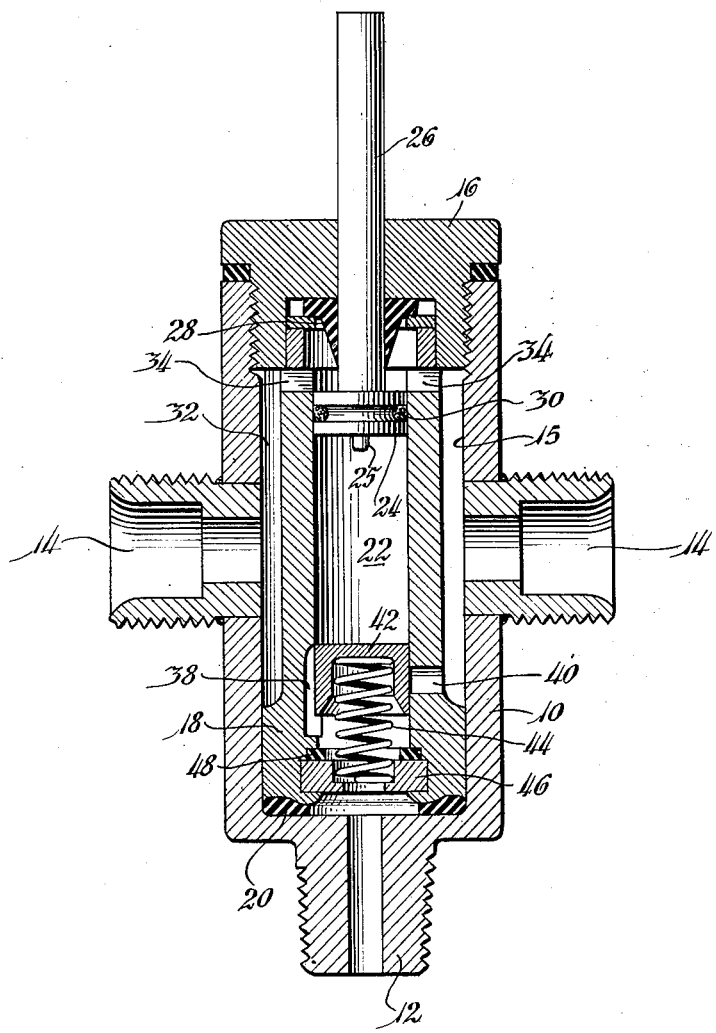
Inventor:
Thomas R. Juettner
By Hinkle, Horton, Ahlberg, Hansmann & Wupp:
Attorneys.

Patented Mar. 10, 1953

2,630,882

UNITED STATES PATENT OFFICE 2,630,882

MEASURING VALVE FOR CENTRALIZED LUBRICATING SYSTEMS

Thomas R. Juettner, Evanston, Ill., assignor to Stewart-Warner Corporation, Chicago, Ill., a corporation of Virginia Application June 16, 1949, Serial No. 99,435

3 Claims. (Cl. 184—7)

My invention relates generally to measuring valves, and more particularly to improved measuring valves suitable for use in centralized lubricating systems in which lubricant from a source is intermittently placed under pressure.

It is an object of my invention to provide an improved measuring valve employing a measuring piston and cylinder provided with a bypass passageway, in which this passageway is controlled by a valve, and in which the piston is moved in both directions by the pressure of the lubricant supplied to the valve.

More specifically, the measuring valve of my invention is an improvement upon the measuring valve shown in the patent to Teal No. 2,205,320, in that it permits the use of a measuring piston which fits closely in its cylinder since a separate bypass controlled by a valve accomplishes the purposes which are attained by the relatively loose fitting piston of the device shown in said patent.

It is therefore an object of my invention to provide an improved measuring valve for use in centralized lubricating systems, which is of simplified construction, is positive and reliable in operation, and which may be economically manufactured.

Other objects will appear from the following description, reference being had to the accompanying drawing which is a central longitudinal sectional view of the improved measuring valve.

As shown in the drawing, the valve comprises a body 10 having a threaded shank 12 for connection to a part to be supplied with the measured change of lubricant, and a pair of fittings 14 which may be welded or brazed to the body 10 and are adapted for connection to the conduit system by which lubricant under high pressure is intermittently supplied to the valve.

The body 10 is provided with a longitudinal bore 15, the upper end of which is closed by a bushing 16. A cylinder member 18 is located within the bore 15, being sealed against the lower end of the bore 15 by a suitable gasket 20. The cylinder member 18 is pressed downwardly into position against the gasket 20 by the engagement of the bushing 16 with the upper end of the member 18.

The member 18 is provided with an axial cylinder bore 22, constituting the cylinder proper, within which there is reciprocable a piston 24 having a stem 26, the stem 26 extending outwardly through the bushing 16, and being sealed by a suitable packing gland 28. The piston 24 has a close sliding fit in the cylinder 22 and may be provided with a sealing ring 30 to effect a lubricant-tight seal between the piston 24 and the cylinder 22. The major portion of the length of the member 18 is of reduced diameter to provide a passageway 32, this passageway communicating with the upper end of the cylinder 22 by virtue of slots 34 formed in the upper end of the cylinder member 18. The lower end of the cylinder 22 is relieved to provide a bypass passageway 38 preferably diametrically opposite a port 40, which connects the passageway 32 with the lower portion of the cylinder 22. An inverted cup-shaped valve 42 is normally held in the position shown in the drawing, where it covers the port 40 and substantially cuts off the bypass passageway 38, by a compression coil spring 44 which rests upon a suitably formed spring seat 46 which is retained in the lower end of the cylinder member 18 by a staking operation. The spring seat 46 also serves to hold in place an annular valve seat 48 which is adapted to be engaged by the lower edge of the valve 42 when the latter is moved to its lowermost position.

Assuming that the measuring valve is filled with lubricant, it operates in the following manner whenever lubricant under high pressure is applied to the conduit system, and hence to the fittings 14.

Lubricant flows from one of these fittings into the passageway 32 and slots 34 into the upper or inlet end of the cylinder 22, forcing the piston 24 downwardly. Such downward movement of the piston 24 forces the lubricant beneath it past the valve 42 and through the bypass passageway 38 and threaded shank 12 to the part to be supplied with lubricant. It will be understood that during the initial application of pressure, the valve 42 moves downward against the force of its spring 44 sufficiently to uncover the bypass passageway 38, and thereby permit the lubricant to flow around it. As the piston 24 approaches the end of its downward stroke, a central projection 25 thereof engages the valve 42 and forces the latter downwardly sufficiently to cut off the lower end of the bypass passageway 38, then uncover the port 40 to force the valve 42 against its seat 48. When the port 40 in uncovered, lubricant may flow through this port into the lower end of the cylinder bore 22, and thus force the piston 24 and stem 26 upwardly until they reach the positions in which they are shown in the drawing. During such return stroke of the piston 24, the valve 42 is maintained in contact with its seat 48 by the lubricant pressure. It will be understood that the piston 24 will move upwardly by virtue of the difference in the areas of its opposite sides which are subjected to lubricant pressure, since the stem 26 projects into the atmosphere and the cross sectional area thereof is effectively subtracted from the upper area of the piston. After the lubricating system has been subjected to lubricant under pressure for a sufficient interval to allow all of the measuring valves connected to the system to have their pistons 24 returned to normal position, as above described, the pressure in the conduit system is relieved, whereupon the spring 44 will force the valve from its seat to the position in which it is shown in the drawing, thus completing the operating cycle.

The amount of lubricant discharged by the measuring valve upon every cycle of operation may be determined by the length of the stroke of the piston 24, and this may be limited in the manner disclosed in said Teal Patent No. 2,205,320. Since the lubricant bypass passageway around the piston 24 is controlled by the valve 42 rather than by clearance between the piston 24 and its cylinder 22, as in the prior constructions, the amount of lubricant discharged upon each operation of the measuring valve is accurately determined by the length of its stroke (and diameter), and since the stroke may be accurately predetermined, it will be clear that the measuring valve is capable of delivering positively accurately measured charges of lubricant upon successive operations, and that the amount of lubricant discharged upon each operation of the measuring valve is not affected by the viscosity of the lubricant used or by temperature. The lubricant is delivered to the part to be lubricated at substantially the pressure at which it is delivered to the measuring valve, the only drop in pressure being that caused by the spring loaded valve 42.

The words "upper" and "lower," and similar directional terms, are used herein only in their relative sense, since the device need not be in the vertical position as illustrated in the drawings, but will operate equally well in any position.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In a device for discharging a predetermined quantity of lubricant to a bearing, in combination, a body having a cylinder therein, a piston reciprocable in said cylinder to discharge lubricant therefrom, said piston having a stem extending through the body to the atmosphere, an inlet and an outlet at opposite ends of said cylinder respectively, a port in said cylinder intermediate the inlet and the outlet thereof, means forming a passageway in said body connecting said inlet and said port, a valve in the cylinder near the outlet thereof, a seat for said valve around said outlet, said valve being operable in one position to close said port and operable in another position to uncover said port and to engage said seat, thereby closing said outlet, means providing a bypass passageway past the valve when the latter, while in port-closing position, is displaced slightly toward its seat, means forming part of said piston to move said valve toward its seat, said port when open allowing equalization of unit pressure on both sides of said piston, said piston being operable upon said equalization of unit pressure to return to its original position, and resilient means to return said valve to its port-closing position upon relief of lubricant pressure in said cylinder.

2. A fluid metering device comprising a body having a cylinder therein, a piston reciprocable in the cylinder, a stem secured to the piston and extending through the body to the atmosphere, a packing gland around the piston rod, a port in the side of the cylinder, an inlet at one end of the cylinder, an outlet at the other end of the cylinder, a passageway connecting the inlet and the port, a piston-type valve reciprocable in the cylinder near the outlet end thereof, a spring biasing the valve to move it to its normal position in which it covers said port, and means forming a bypass passageway around the valve when it is displaced from its normal position against the force of the spring a short distance insufficient to cause it to uncover said port.

3. A fluid metering device comprising a body having a cylinder therein, a piston reciprocable in the cylinder, a stem secured to the piston and extending through the body to the atmosphere, a packing gland around the piston rod, a port in the side of the cylinder, an inlet at one end of the cylinder, an outlet at the other end of the cylinder, a passageway connecting the inlet and the port, a piston-type valve reciprocable in the cylinder near the outlet end thereof having a normal position and two operating positions, a spring biasing the valve to move it to its normal position in which it covers said port, and means forming a bypass passageway around the valve when it is in its first operative position in which it is displaced against the force of the spring a distance sufficient to open said bypass passageway but insufficient to uncover said port, said valve being moved to its second operative position in which it closes the bypass passageway and uncovers the port when engaged by the piston upon completion of the discharge stroke thereof.

THOMAS R. JUETTNER.

REFERENCES CITED

The following references are of record in the file of this patent:

UNITED STATES PATENTS

| Number | Name | Date |
|---|---|---|
| 1,933,905 | Hawks | Nov. 7, 1933 |
| 2,205,320 | Teal | June 18, 1940 |